UNITED STATES PATENT OFFICE.

GEORG KIRKEGAARD, OF BROOKLYN, NEW YORK, ASSIGNOR, BY MESNE ASSIGNMENTS, TO NATIONAL GRAPHITE LUBRICATION COMPANY, OF WILMINGTON, DELAWARE, A CORPORATION OF DELAWARE.

GRAPHITE COMPOUND AND PROCESS OF MAKING IT.

1,185,682. Specification of Letters Patent. Patented June 6, 1916.

No Drawing. Application filed February 12, 1913. Serial No. 747,978.

*To all whom it may concern:*

Be it known that I, GEORG KIRKEGAARD, a citizen of the United States of America, residing in the borough of Brooklyn, county of Kings, and State of New York, have invented a certain new and useful Improved Graphite Compound and Process of Making It, of which the following is a specification.

This invention relates to solid bodies of graphite or bodies the principal ingredient of which is graphite associated with a binder that is soluble and that serves to afford to pulverized or flocculent graphite such co-hesion or adhesion as to maintain the entire mass in the form of a solid body. Particularly the invention relates to such solid bodies of graphite as are employed in a system of lubrication of steam engines, for instance.

In a patent granted to Lewis S. Watres, No. 1,017,935 dated February 20, 1912 there is described a system of lubrication which consists in the use of solid bodies of graphite as distinguished from flocculent masses of graphite and in which the solid bodies of graphite are abraded or gradually reduced to powder-like form,—the finely divided graphite being transmitted in the operation of the engine to the surfaces to be lubricated.

This invention particularly relates to such solid bodies of graphite whatever may be their form or dimensions: and the purpose of the invention is to provide such solid bodies of graphite from constituents that lend themselves to the function of lubrication and that do not act to abrade the surfaces to be lubricated or interfere with the lubricating qualities of the graphite *per se*. As incidental to such use of the bodies of graphite, it is highly desirable that they should be proof against the action of water and steam since in such a system of lubrication they are or may be exposed to the action of steam and water of condensation.

This invention comprises a body in solid forms in which is combined powdered or flocculent graphite and a soluble binder of vegetable origin. I have by experience demonstrated that a mixture of gum shellac and alcohol, commonly known as liquid shellac, is highly efficient in the respects above indicated. Such a liquid shellac may be compounded with alcohol in any suitable proportions provided the liquid is sufficiently fluid to be suitably mixed with the powdered or flocculent graphite. The mixture may, for instance, be one gallon of alcohol and four pounds of gum shellac. To one hundred parts by weight of pulverized or flocculent graphite there may be added fifty-five parts of liquid shellac. These two materials are thoroughly mixed and molded under pressure into definite form. The molded bodies are then slowly dried, preferably by artificial heat, to accelerate the operation in order to eliminate, with sufficient slowness, the alcohol or drive it off to such extent as that more rapid drying at higher temperature will not tend to create breaks, fissures or blow-holes in the body. This preliminary drying may take place at a temperature of one hundred and fifty degrees Fahrenheit after which the molded body may be subjected to higher temperature, say from four to five hundred degrees Fahrenheit, more or less, for a period of time to suitably dry and harden it. Experience has shown that a temperature of 500° F., continued for half an hour or so is sufficient in the sizes I employ.

I have found by practice that the mixture of flocculent graphite and liquid shellac may be placed in a receptacle having a contracted discharge nozzle of appropriate diameter and of circular or other suitable cross section and be subjected to high pressure from a plunger to cause the issue from the nozzle of a rod of the compound of indefinite length. The rod or body so formed may then be preliminarily dried to sufficiently eliminate the alcohol, and may then be cut or sawn into desired lengths: or the entire body may be subjected first to the baking at high temperature after which it may be sawn into appropriate lengths. For the purpose of use in the Watres system of lubrication such sticks or blocks of graphite may be an inch in diameter and an inch or so in length. Such bodies of "solid" graphite when dried are water-proof and steam-proof, and the small quantity of shellac used as binder is not in any way detrimental to the lubricating action for which the bodies are primarily intended. By the term alcohol, which is one of convenient use, I intend to include liquids of the alcohol family, such as grain alcohol, wood alcohol, and fusel oil. However other readily volatile solvents of shellac may be used such as amylacetate, acetone, sulfuric ether and other ethers, provided they form a proper combination with the gum shellac and inert graphite and do not act detrimentally to lubricating functions. Indeed, any suitable liquid or menstruum may be used to bring the shellac or other waterproof binder into solution.

Baking of the bodies produced as hereinbefore described at relatively high temperature, as for instance from four to five hundred degrees, may produce more or less carbonization of the shellac binder, or of other binders susceptible of carbonization. Such carbonization may occur completely throughout the entire mass of the body if the temperature be sufficient and the heat be prolonged adequately. A feature of this invention is therefore that the binder may be carbonized to a greater or less extent; and that therefore the completed article, when used for lubrication in the manner suggested, delivers to the surfaces to be lubricated a finely divided material, i. e. graphite, which being inert is not affected by the baking operation and a small proportion of the binder which may be more or less carbonized, or which will become more or less carbonized by the internal heat of the machine being lubricated if it is a steam or internal combustion engine; I, therefore, use a soluble binder of vegetable origin such as shellac, before named, which I have found to produce the best results. Other carbonizable matter may, however, be used—such, for instance as casein, which has not however afforded results so satisfactory as those accompanying the use of shellac, and such a dextrin, which is also carbonizable, and with which fairly good results may be obtained. However, experience has shown that with such substances as casein and dextrin the resulting product is not water-proof and steam-proof and hence I prefer to employ a substance such as shellac that affords the desirable qualities of a binder and, at the same time, imparts to the product water and steam proof qualities.

I claim:

1. A normally solid lubricant consisting essentially of graphite and a plastic carbonizable binder, said binder being at least partially carbonized.

2. A normally solid lubricant consisting essentially of flocculent graphite, and a resinous partially carbonized binder.

3. A solid body composed essentially of graphite, finely divided, and a resinous substance as a binder.

4. A solid body composed of finely divided graphite and a partially carbonized resinous binder.

5. A dried solid body composed essentially of graphite in finely divided form held together by shellac.

6. A process of forming solid bodies composed essentially of graphite which consists in mixing with finely divided or flocculent graphite a soluble water-proof binder dissolved in a suitable menstruum, giving such mixture definite solid form by pressure, and then evaporating from the body so formed the volatile constituents of the menstruum.

7. The process of making a lubricating solid body, which consists in mixing finely divided graphite with a solution of a resinous binder in a volatile solvent, molding, drying and heating.

8. A process which consists in making a solution of shellac in alcohol, and mixing with said solution to a stiff paste, flocculent graphite, molding, drying and heating to partial carbonization of the shellac.

In testimony whereof, I have hereunto subscribed my name.

GEORG KIRKEGAARD.

Witnesses:
CHAS. E. WADE,
M. F. SMITH.